United States Patent
Marks et al.

(10) Patent No.: US 12,248,502 B1
(45) Date of Patent: Mar. 11, 2025

(54) STRUCTURED FILTERING FOR A NATURAL LANGUAGE INPUT BASED ON GENERATIVE ARTIFICIAL INTELLIGENCE

(71) Applicant: Quorum Analytics LLC, Washington DC, MD (US)

(72) Inventors: Jonathan Marks, Boulder, CO (US); Petru Hincu, Chişinău (MD)

(73) Assignee: QUORUM ANALYTICS LLC, Washington, DC (US)

( * ) Notice: Subject to any disclaimer, the term of this patent is extended or adjusted under 35 U.S.C. 154(b) by 0 days.

(21) Appl. No.: 18/244,118

(22) Filed: Sep. 8, 2023

(51) Int. Cl.
*G06F 7/00* (2006.01)
*G06F 16/334* (2025.01)
*G06F 16/335* (2019.01)

(52) U.S. Cl.
CPC ........ *G06F 16/335* (2019.01); *G06F 16/3344* (2019.01)

(58) Field of Classification Search
CPC .... G06F 16/335; G06F 16/3344; G06F 16/93; G06F 16/345; G06F 16/903; G06F 16/285; G06F 16/9032; G06F 16/2423; G06F 16/31; G06F 40/93; G06F 40/284; G06F 40/186; G06F 40/216; G06F 40/30; G06F 40/40; G06F 40/56
See application file for complete search history.

(56) References Cited

U.S. PATENT DOCUMENTS

| | | | | |
|---|---|---|---|---|
| 2018/0336972 | A1* | 11/2018 | Carbonell | G06F 16/93 |
| 2021/0342723 | A1* | 11/2021 | Rao | G06Q 40/12 |
| 2023/0214096 | A1* | 7/2023 | Arora | G06F 3/04817 |
| | | | | 715/764 |
| 2024/0144676 | A1* | 5/2024 | Arroyo | G06F 40/284 |
| 2024/0176960 | A1* | 5/2024 | Maurer | G06F 40/40 |

* cited by examiner

*Primary Examiner* — Mohammad A Sana
(74) *Attorney, Agent, or Firm* — Womble Bond Dickinson (US) LLP

(57) ABSTRACT

This disclosure provides systems, devices, apparatus, and methods, including computer programs encoded on storage media, for filtering a dataset. The apparatus may receive, via a user interface, a natural language input for a search of the dataset. The natural language input is an unstructured input. The apparatus maps the unstructured input to one or more filters associated with the natural language input based on execution of a generative AI model. The mapping of the unstructured input transforms the unstructured input into a structured input. The apparatus outputs, via the user interface, a result of the search based on an application of the one or more filters to the dataset.

20 Claims, 10 Drawing Sheets

STRUCTURED FILTERING FOR A NATURAL LANGUAGE INPUT BASED ON GENERATIVE ARTIFICIAL INTELLIGENCE

TECHNICAL FIELD

The present disclosure relates generally to searching databases, and more particularly, to using artificial intelligence (AI) for searching a structured database with an unstructured query description.

BACKGROUND

Many search interfaces apply a combination of filters and/or natural language query operators to return a search result for a search query. A software application associated with the search interface will perform a search across a dataset and apply various filtering to the dataset/search results based on the search query. However, some search interfaces may not be user-friendly in terms of their searching and filtering operations, such as when the user is unaware of the various filters that exist for the search interface, which dataset to search, and/or how to implement the filters to perform the search. That is, the user may not know where to search, what types of searches are possible, how do perform the search, etc.

When a user provides a natural language input to a search interface, the search results may be based on unstructured filtering. However, a user who lacks knowledge of structured filtering and searching operations for the search interface may not be able to obtain a search result based on structured filtering. Accordingly, there is a need for a more user-friendly search interface for natural language inputs and structured filtering.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In aspects of the disclosure, a method, a computer-readable medium, and an apparatus are provided. The method includes receiving, via a user interface, a natural language input for a search of the dataset, the natural language input being an unstructured input: mapping the unstructured input to one or more filters associated with the natural language input based on execution of a generative artificial intelligence (AI) model, the mapping being to transform the unstructured input into a structured input; and outputting, via the user interface, a result of the search based on an application of the one or more filters to the dataset.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
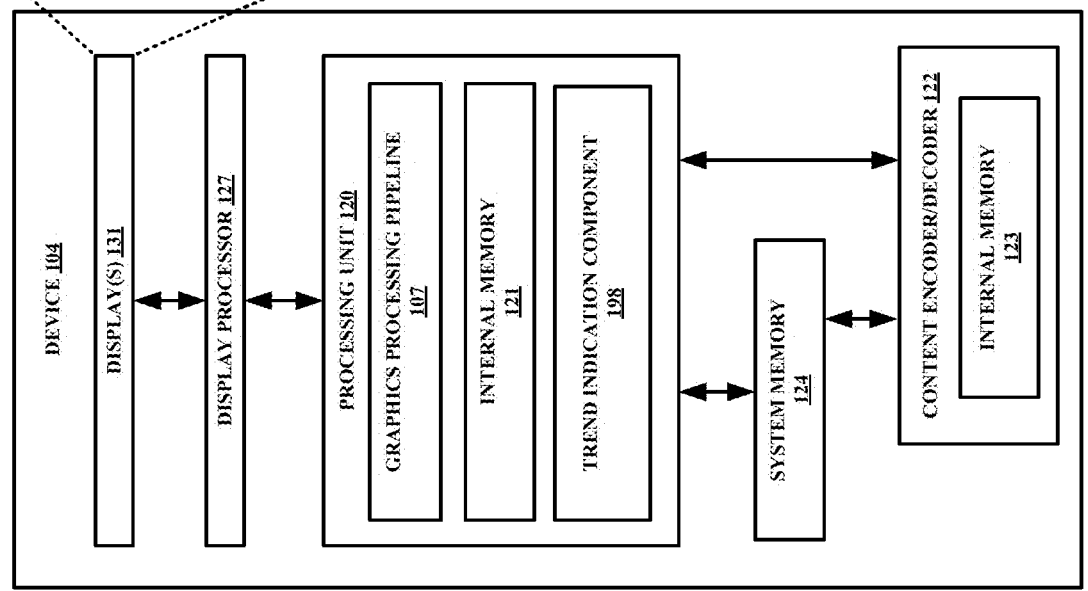
FIG. 1 is a diagram illustrating an example content generation system.
Figure 1:
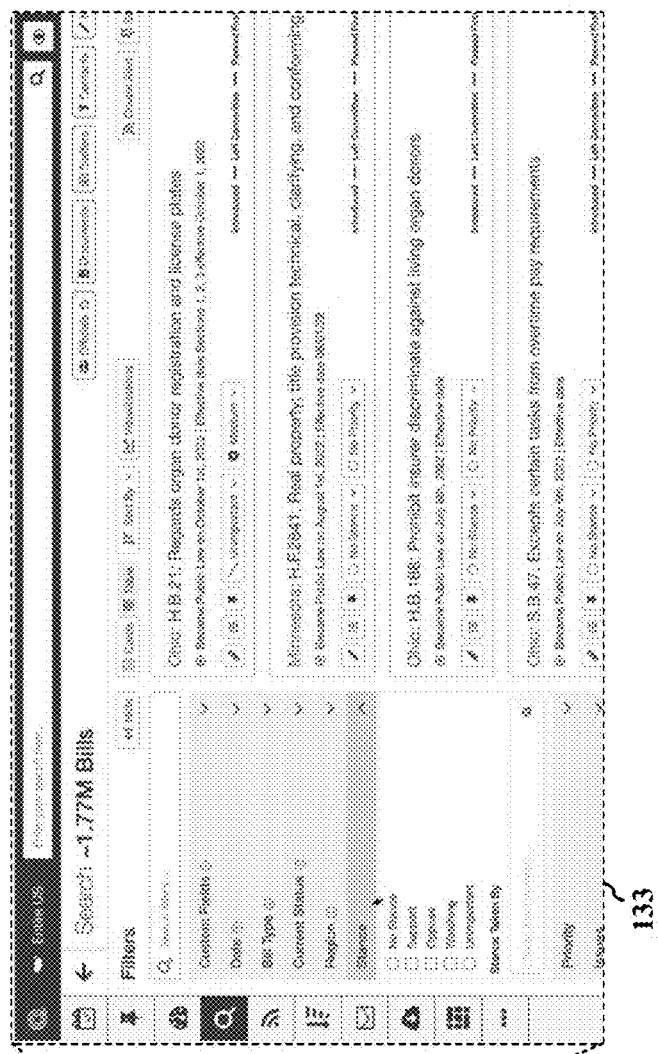

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects are presented with reference to various apparatus and methods. These apparatus and methods are described in the following detailed description and illustrated in the accompanying drawings by various blocks, components, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip, baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a block diagram that illustrates an example content generation system 100. The content generation system 100 includes a device 104 that has one or more components or circuits for performing various functions described herein. The device 104 may include one or more displays 131, a display processor 127, a processing unit 120, a system memory 124, a content encoder/decoder 122, etc. Display(s) 131 may also be referred to herein as one or more displays 131. In some examples, graphics processing results/graphical content associated with an output of a search engine may be displayed through a user interface (UI) 133 on the display(s) 131. In other examples, the graphical processing results/graphical content may be transferred to another device for display, which may be referred to as split-rendering.

The processing unit 120 may include a graphics processing pipeline 107 and an internal memory 121. The processing unit 120 may be configured to perform graphics processing using the graphics processing pipeline 107. The processing unit 120 may also generate the graphical content displayed through the UI 133. The processing unit 120 further includes a trend indication component 198, as will be discussed in further detail below; for performing various aspects and functionality described herein.

The display processor 127 may be configured to perform one or more display processing techniques on one or more frames/graphical content generated by the processing unit 120 before the frames/graphical content is displayed through the UI 133 on the one or more displays 131. While the example content generation system 100 illustrates a display processor 127, it should be understood that the display processor 127 is one example of a processor that can perform the functions descried herein and that other types of processors, controllers, etc., may be used as substitute for the display processor 127. The one or more displays 131 may be configured to display or otherwise present graphical content processed/output by the display processor 127. In some examples, the one or more displays 131 may include a liquid crystal display (LCD), a plasma display, an organic light emitting diode (OLED) display, a projection display device, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 includes the internal memory 121. The content encoder/decoder 122 may also include an internal memory 123. The processing unit 120 and the content encoder/decoder 122 may be communicatively coupled to the system memory 124 over a bus. In some examples, the processing unit 120 and the content encoder/decoder 122 may be communicatively coupled to the internal memories 121/123 over the bus or via a different connection. The content encoder/decoder 122 may be configured to receive graphical content from any source, such as the system memory 124 and/or the processing unit 120, and encode or decode the graphical content. In some examples, the graphical content may be in the form of encoded or decoded pixel data. The system memory 124 may be configured to store the graphical content in an encoded or decoded form.

The internal memories 121/123 and/or the system memory 124 may include one or more volatile or non-volatile memories or storage devices. In some examples, internal memories 121/123 or the system memory 124 may include RAM, static random access memory (SRAM), dynamic random access memory (DRAM), erasable programmable ROM (EPROM), EEPROM, flash memory, a magnetic data media, optical storage media, or any other type of memory: The internal memories 121/123 or the system memory 124 may be a non-transitory storage medium according to some examples. The term "non-transitory" may indicate that the storage medium is not embodied in a carrier wave or a propagated signal. However, the term "non-transitory" should not be interpreted to mean that the internal memories 121/123 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), or any other processing unit that may be configured to perform graphics processing. The content encoder/decoder 122 may be any processor configured to perform content encoding and content decoding. In some examples, the processing unit 120 and/or the content encoder/decoder 122 may be integrated into a motherboard of the device 104. The processing unit 120 may be present on a graphics card that is installed in a port of the motherboard of the device 104, or may be otherwise incorporated within a peripheral device configured to interoperate with the device 104. The processing unit 120 and/or the content encoder/decoder 122 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combination thereof. If the techniques are implemented partially in software, the processing unit 120 and/or the content encoder/decoder 122 may store instructions for the software in a suitable, non-transitory computer-readable storage medium (e.g., memory) and may execute the instructions in hardware using one or more processors to perform the techniques of this disclosure. Any of the foregoing, including hardware, software, a combination of hardware and software, etc., may be considered to be one or more processors.

In certain aspects, the processing unit 120 (e.g., GPU, CPU, etc.) may include a trend indication component 198, which may include software, hardware, or a combination thereof configured to: receive, through a user interface, an input indicative of a document corpus from which to indicate the trends of the document set, the document corpus corresponding to one or more document corpuses included in the document set: filter the document corpus based on user-specific criteria to provide a filtered document corpus, the filtered document corpus corresponding to a subset of documents from the document corpus; and output an indication of the trends of the document set based on trending text of the filtered document corpus, the trends of the document set corresponding to the trending text of the filtered document corpus. Although the following description may be focused on indicating trends within a document set, the concepts described herein may be applicable to other similar processing techniques.

Figure 2:
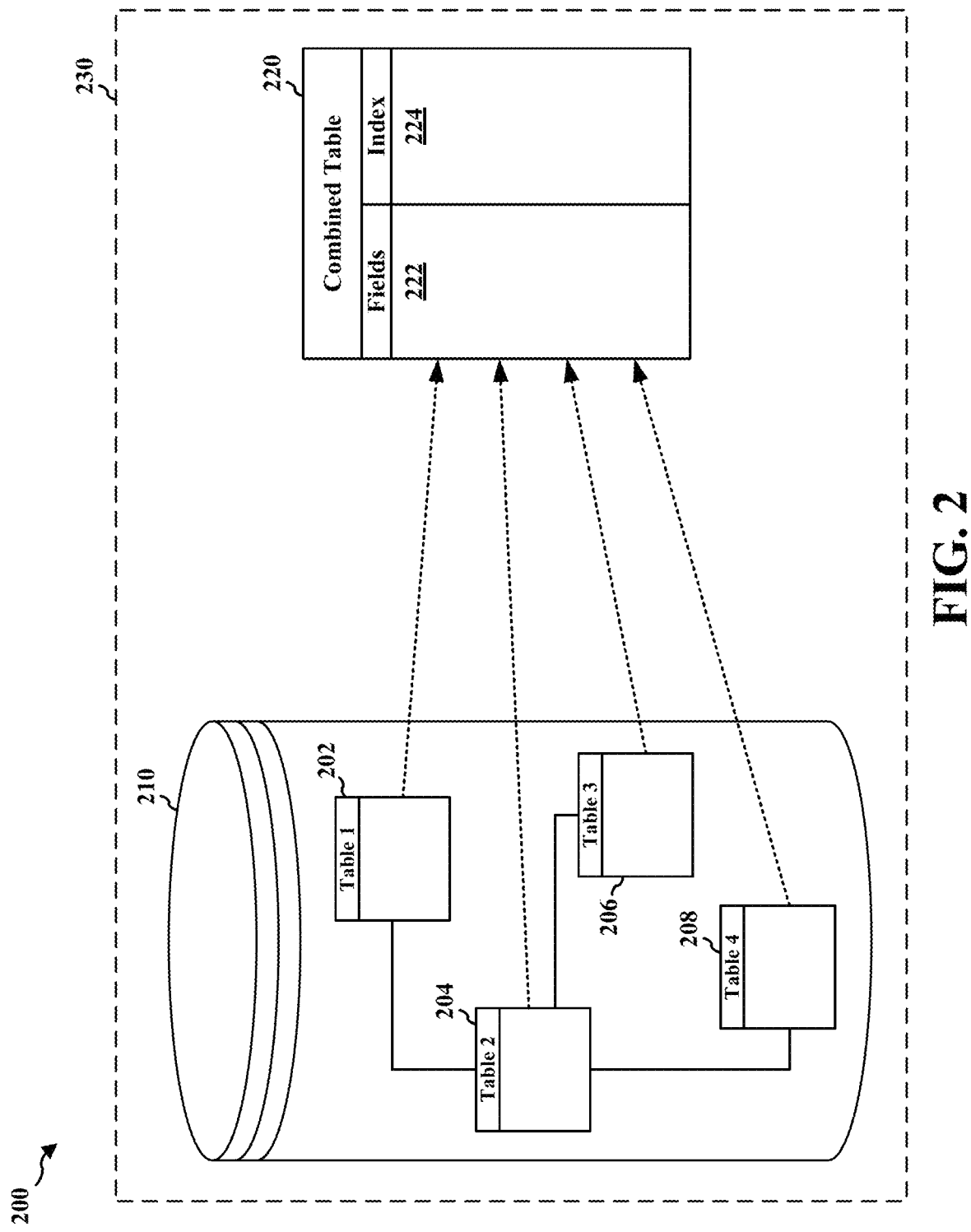
FIG. 2 is a diagram illustrating a mapping from a plurality of tables associated with different data sets to a combined table.

FIG. 2 is a diagram 200 illustrating a mapping from a plurality of tables 202-208 associated with different data sets to a combined table 220. Input/output (I/O) load reductions based on full-text search (FTS) indices may increase a search speed of documents/information stored in a database 210 and improve a user experience. For example, removing FTS indices may reduce the I/O load associated with FTS procedures by 20-30%, which may increase the document search speed by a factor of 10 and increase the update/insert (i.e., "upsert") speed by a factor of 100. More accurate document search results may also be provided based on eliminating phrase searches associated with FTS processes.

In examples, rather than joining different data sets together, such as table 1 202, table 2 204, table 3 206, and table 4 208, through various logical connections in a relational database 210 and searching the different data sets during a same procedure, information from separate tables 202-208 within the database 210 may be combined and stored in a same data set as a combined table 220 to perform a search across both common data, such as general document information applicable to multiple users (e.g., title, document number, etc.), as well as user-specific data, such as a "stance" that the user has (e.g., likes or dislikes) for particular documents within the database 210.

A search of the combined/stored data associated with a single/combined table 220 may be executed more quickly than a search of data stored in the relational database 210 that might include the various logical connections between the multiple data sets/tables 202-208. The data mapped to the combined table 220 from the different data sets of the relational database 210 may be searched based on a single index 224. Indexing the information in the data set may include changing a search destination to indicate a different destination than FTS indices. The index 224 may be sharded into different logical segments for different types of data. For example, documents in the data set may be of different types, including "documents" as an alias for feature-based document indices, a separate shard for each of news articles, social media posts, legislation, or other types of documents, etc. However, sharding techniques may be less applicable in cases where new types of documents are being generated and added to the data set. Therefore, indexing procedures may be performed based on a retention period or performed in a manner that combines newly generated documents with other document types. The index 224 could be updated daily, monthly, etc., depending on a size of the data set, where each updated index 224 might include 3-5 shards. Each shard might be further limited in size to 10-50 gigabytes (GB).

FTS searches may be performed on data stored in the relational database 210. For example, if a user performs a search for a legislative bill in the relational database 210, metadata might be generated that indicates whether the user views the legislative bill favorably (e.g., likes or dislikes the bill), whether the legislative bill is associated with a particular issue of interest to the user, whether the user views the legislative bill as important, etc. The metadata might also be indicative of a public official that sponsored the legislative bill and/or a political party from which the legislative bill originated. Different fields of information may be stored in the different tables 202-208 that are logically connected for searching the data based on a relational model. The information in the different tables 202-208 may be filtered based on an input to generate an output indicative of a particular field, but processing speeds may be decreased as a result of having to index across the various logical connections to the different data sets/tables 202-208.

Unlike relational database searching, which may be based on searching multiple tables 202-208 that include the different data sets to generate the output, a single index 224 with increased robustness may be used to search a same data set/table 220. The indexing structure for the search may allow the data set to be searched more efficiently given that a non-relational model does not rely on logical interconnections between many different tables/data sets. Database fields for each document/table 202-208 stored in the database 210 may be mapped to search fields 222 for performing the search. Example database fields might include "created" or "updated" fields and a corresponding example database field type might include a "date" field type. In another example, the database field might be a "position in record" and the corresponding database field type might be an "interger" field, which may be mapped to an "int" search type. Many other database fields/types and search fields/types are contemplated by this disclosure. Single index searches may also offer backward compatibility in terms of searching, filtering, functionality, etc.

A database 230 that includes the combined table 220 for the search may be updated based on a cron or any other mechanism for processing updates to datasets, such as reading items from a queue. The cron may be executed at periodic intervals to check for and store new/updated documents in the database 230 for indexing. In some examples, other crons may be executed at the same or different periodic intervals to delete documents from the database 230. For example, a cron may be executed daily or monthly to remove documents from the database 230 that have become stale. When the database 230 includes a large number of documents, indexing all the documents during a same procedure might decrease a speed of the search. Hence, a plurality of crons may be executed to store/update various documents by type, region, etc.

Denormalization techniques may be implemented to increase performance based on copying information from multiple tables 202-208 into the combined table 220 used for the search. Demormaliztion refers to the process of adding redundant copies of data or grouped data to a data set to improve a read performance of the database 230, but which may come at a cost to the write performance of the database 230. In an example, a legislative bill might include information that is common for each user that downloads the legislative bill (e.g., the title, the bill number, etc.). Thus, storing N copies of the legislative bill for each user in the database 230 may result in decreased performance, particularly when certain information is redundant/common to different user searches. Accordingly, indexing techniques may be based on aggregating data from multiple users searches and denormalizing the data to improve the search speed. Aggregation and denormalization may be performed for each data type of a plurality of data types included in the different tables 202-208 and/or may be performed for arbitrary data types. The data may be stored in the combined table 220 that may be searched by one or more users. When the data is searched, the data may be reduced to reveal only information that a searching user is authorized to view (e.g., based on filtering).

Figure 3:
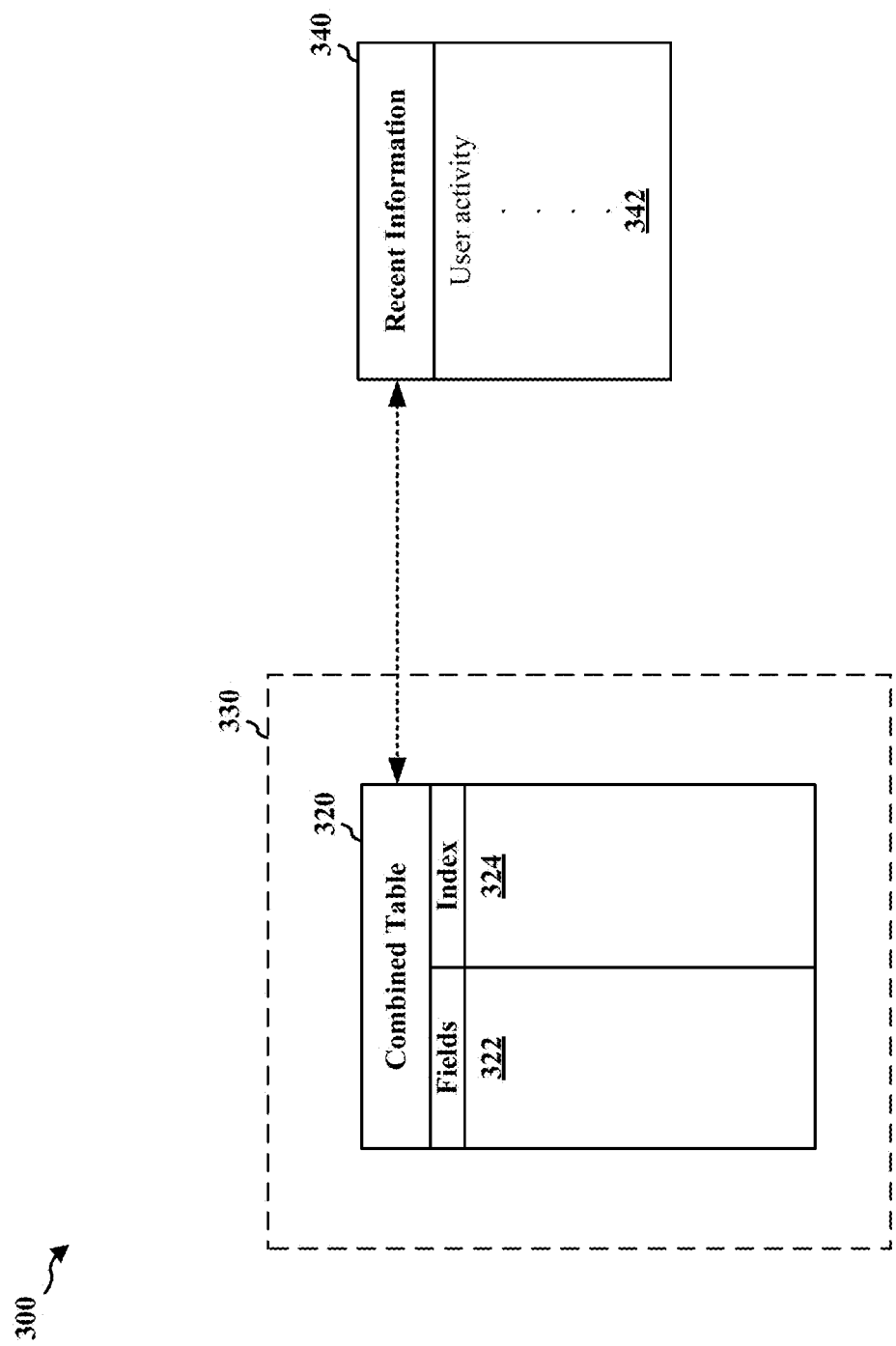
FIG. 3 is a diagram that illustrates recent information for a user being generated after a most recent indexing update to a combined table.

FIG. 3 is a diagram 300 that illustrates recent information 340 for a user being generated after a most recent indexing update to a combined table 320. Based on a mapping from a relational database to the fields 322 of the combined table 320, user-specific information/inputs may be analyzed for changes that have occurred since the index 324 was last updated. If user information has changed, the data set may be re-indexed/resaved based on the recent changes at a next update time for the index 324. Logical connections between different tables of the relational database may also be updated periodically prior to performing mappings of the data to the combined table 330 for indexing. The index 324 may be used for one or more search queries of one or more users. Some data structures may or may not include both relational and non-relational databases. For example, the database 330 illustrated in FIG. 3 might be a standalone database that includes the combined table 320, whereas the database 230 illustrated in FIG. 2 might include both a non-relational data set (e.g., the combined table 220) and a relational data set (e.g., the different tables 202-208).

Results from the denormalized database 330 may be combined with the recent information 340 based on recent user activity 342 to increase an accuracy of the output for a search query. An output generated based on both the denormalized data and the recent information 340 may be compared to a relational database output to determine whether the outputs are the same. If so, the relational database output/model may be used. Otherwise, the combined information output is used. A join that occurs in the relational database may increase the speed of the search. In other databases, where a FTS would have been slow using a relational database and/or filtering, the combined table 320 may be used to increase the speed, given that there may not be a difference in the output results.

As the index 324 may be updated on a periodic basis, a delay period may occur where new information has become available but the index 324 has not yet been updated based on the new information. Thus, if a user executes a search (e.g., indicating an assignment and/or a stance for a search), the generated results might be more accurate if the output also accounts for the recent information 340/user activity 342 that has not yet been considered for indexing in the combined table 320. Since denormalization might not be a continuous procedure, or even a frequently procedure, due to an increased amount of time associated with updating large indexes (that may include millions of links), a tradeoff may be observed between updating the index 324 on a more frequent basis and being able to search/retrieve information more quickly.

Single index searching may be extended to data associated with recent user activity 342 (e.g., caching user-provided metadata alongside non-user-provided metadata). For example, a user may select a first legislative bill of interest to the user. A few second later the user may execute a search for other bills of interest to the user, which might include a match to a particular search term. Updating a common/global index 324, which may be used by multiple users, to reflect recent user activity 342 may be a relatively slow procedure that could impact a speed of the search results for a query. Additionally, cached information may be outdated, which may lead to less accurate search results.

Accordingly, data associated with recent inputs from a user might not available to contribute to search results until after the index 324 is refreshed/updated at a periodic/predefined interval. Thus, when a user performs a search, a separate query may be executed to search for recent information 340/inputs (e.g., that may be less than 15 minutes old) corresponding to a search type of the search being performed. For instance, if the search type corresponds to a "stance" on a legislative bill, such as the user views the bill favorably, the separate query may be executed to search for other stances that the user has recently input (e.g., within the last 15 minutes). In an example, a user might indicate that legislative bill X is of interest to the user. Further, a relational database might indicate which stance(s) have occurred over a recent timeframe (e.g., last 15 minutes), so that the stances may be considered along with the combined table 320 to generate an output. That is, the separate query executed based on a user search that occurs 30 seconds after the index 324 is updated may allow the output results to be based on the stance(s) associated with the recent user activity 342.

In another example, a search may be executed for bills that reference X along with an additional query parameter. Some outputs may provide outdated results (e.g., by a few; minutes), if the outputs do not account for recent inputs from the user. The bills that reference X might not change. However, the additional query parameter might be outdated (e.g., by a few minutes) as a result of delays in updating the index 324. When a search is performed by the user, the bills that reference X may be queried along with the additional query parameter. To reduce a possibility of having the results be outdated, a relational database is also queried to determine the recent information 340/inputs from the user related to the additional query parameter. As text searching may not be part of the separate query associated with the user activity 342, the search may be performed relatively quickly.

For execution of a search for the bills that reference X along with the additional query parameter, documents determined to be associated with the recent information 340/inputs may be used to generate the results. In examples, such documents may be further searched based on text conditions. Some results associated with the recent information 340 may also be excluded, if the user activity 342 indicates that the results do not satisfy the additional query parameter. The search for the recent information 340 may be time bounded based on a periodic interval for updating the index 324. For example, if the index is updated every M minutes, user activity searches of the relational database may be limited to the previous M minutes, or an even shorter time to the last index update.

Figure 4:
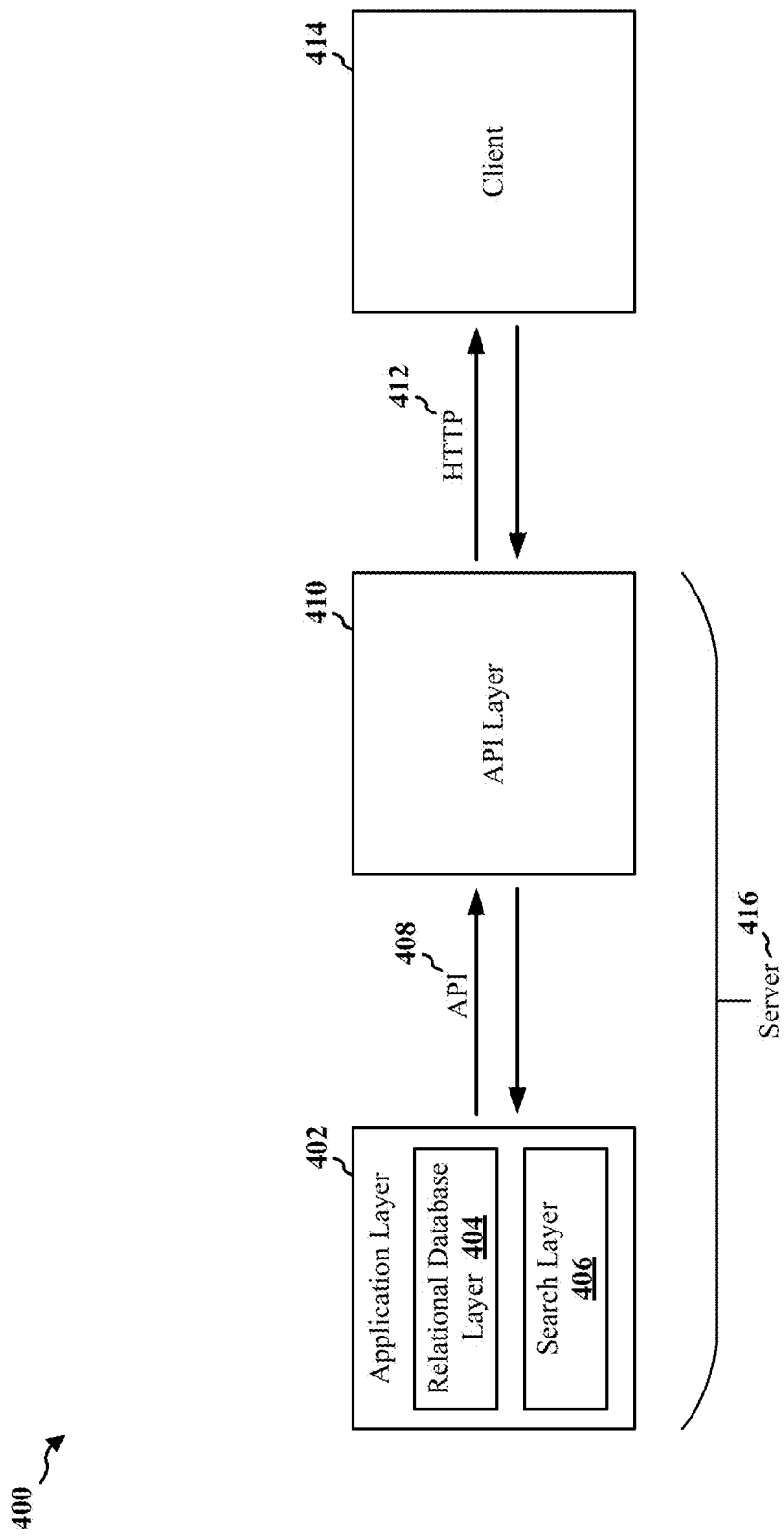
FIG. 4 is a diagram that illustrates layers and interfaces for a server and a client.

FIG. 4 is a diagram 400 that illustrates layers and interfaces for a server 416 and a client 414. In order to increase security over information that is viewable to specific users at the client 414, a filter may be applied on top of output information from an application layer 402 before the information is received by an application programming interface (API) layer 410 over an API 408. The filter may be user-specific so that a particular user is only able to view the information that the user is authorized to view. The API layer 410 may not have access to the information in a data store (e.g., search documents), and may communicate with the application layer 402 to receive the information. Within the application layer 402, a relational database layer 404 may be in communication with a searching layer 406.

Some user information may be indexed, rather than stored at the searching layer 406. A user may transmit a request from the client 414 to the server 416, such as by hypertext transfer protocol (HTTP) 412, which may indicate a query for the searching layer 406. The query may trigger filtering operations, such as a filter for FTS or query parameters, for displaying information fields to the users via the client 414. The information may be serialized and sent to a front end for the user to view at the client 414.

User identity information might not be the subject of a user query, but the query and the identity of the user may be determined for applying the filter. However, the identity of the user may remain secure based on applying the filter to the search/query, as the information indicated to the application layer 402 over the API 408 is not indicative of the user identity. That is, the information filtered out for the query is not used by the application layer 402 to return information to other users that are also initiating queries on the same data set, which provides a level of information security for the user of the client 414. In particular, user-specific/private information is filtered out, which provides a first layer of security at the client level based on queries not requesting user information and a second layer of security at the application layer 402 based on the filtering.

Searches at the searching layer 406 may be based on predefined search options (e.g., drop-down menus, radio buttons, etc.) and/or based on free text searches (e.g., search bars). Some searches may be executed based on objective criteria, such as titles, labels, etc., while other searches may be executed based on subjective criteria, such as a stance that the user has on a particular document. Hence, some search results may be returned using a snippet engine that indicates highlighted snippets from one or more documents. The snippet engine may determine to highlight snippets based on one or more query parameters used for the search at the searching layer 406.

Fast types of queries may experience a 4 times increase in search speed based on the searching techniques described herein and slower types of queries may experience a 20-40 times increase in search speed based on the searching techniques described herein. Join results may also experience a corresponding increase in speed based on denormalization procedures. Rather than having multiple different tables that are logically connected, denormalization allows the information to be included in a same/combined table, which provides the increase in search speed. A tradeoff between normalization and denormalization is that denormalization provides for faster querying, but may experience a reduction in accuracy, whereas normalization may provide for slower querying, but can produce results with improved accuracy. Thus, the searching techniques described herein may be implemented to balance the tradeoff between search speed and accuracy.

Figure 5:
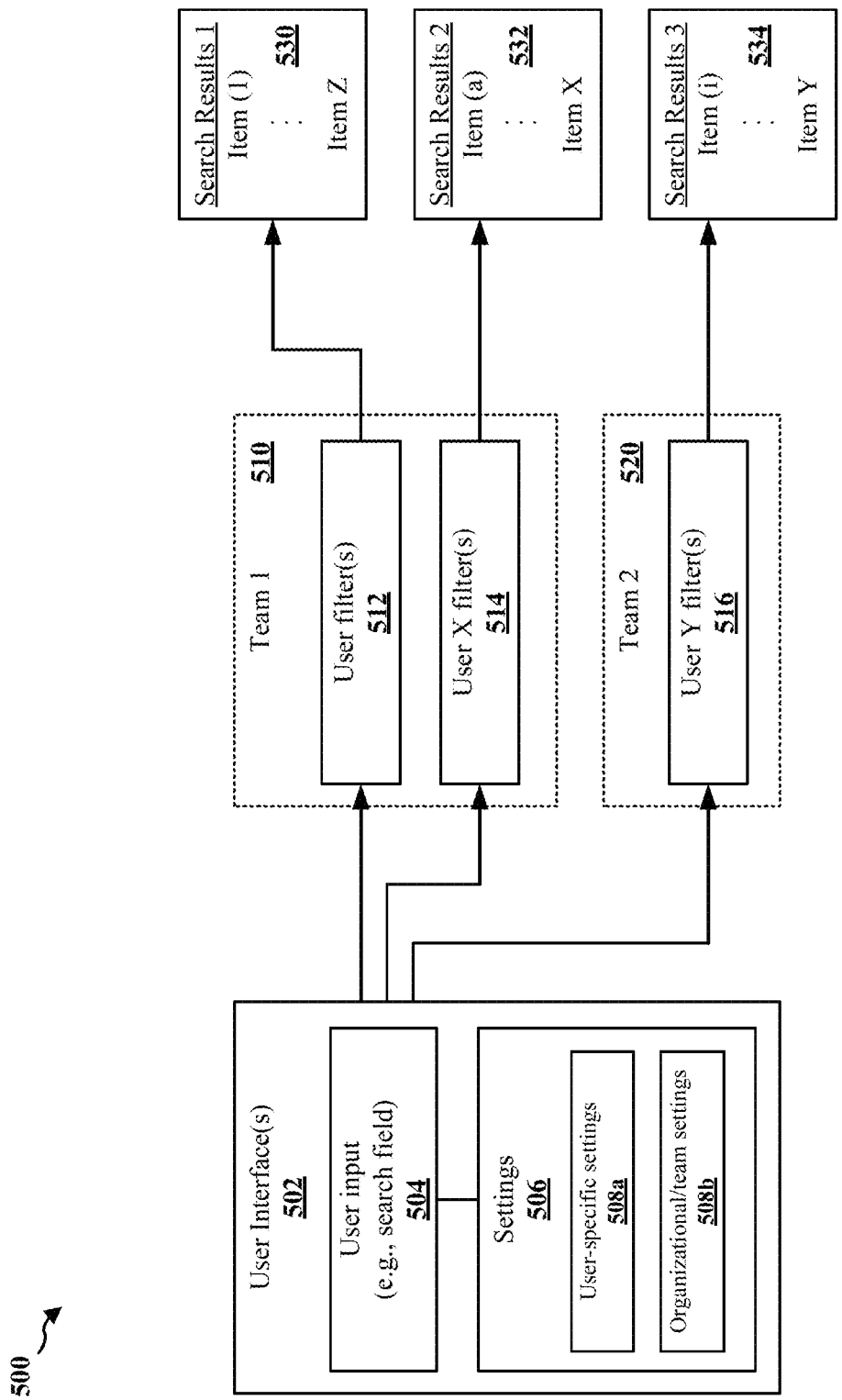
FIG. 5 is a diagram illustrating an information workflow.

FIG. 5 is a diagram 500 illustrating an information workflow. An organization might add or eliminate search terms from a search term list based on a stance (e.g., supports or opposes) that one or more users within the organization have with respect to a particular bill/document stored in the database. For example, if a user likes/dislikes a particular bill, or regards the particular bill as unimportant, the bill can be flagged accordingly on a tracking board (illustrated in FIG. 6) or removed from the tracking board altogether. While a bill/document might get removed from the tracking board based on a single criterion, different users within the organization might filter 512-516 the documents of the database in different ways, which might generate inconsistencies in the output search results 530-534 and/or inconsistencies in the removal of bills/documents from the tracking board. For instance, a first user might filter 512 the documents based on U.S. states A, B, and C, whereas a second user might filter 514 the document based on U.S. states A, D, and E. Thus, updated functionalities associated with the tracking broad for different filtering combinations might improve a user space and/or a workflow for the organization and/or the one or more users.

The updated functionality might increase an efficiency for which groups/teams 510/520 of users can track large amounts of information from multiple different jurisdictions and/or multiple different types of contacts. In an example, a multinational corporation might be interested in state legislation within in the United States. For instance, the multinational corporation may be a soft drink company that has an interest in a new soda tax that different states or local governments are attempting to pass. If the multinational company takes a stance against the newly proposed soda tax, the company may want to know which jurisdictions/areas that tax is being proposed, so that the company can hire a team of lobbyists to oppose the bill. For example, the company might determine that a best use of resources for the particular situation could be to hire ten state lobbyists and four local lobbyists, where the state lobbyists may be allocated in different ways. Perhaps a first subset of the ten state lobbyists is responsible for three states and also the concept of sugar taxes, a second subset of the ten lobbyists is responsible for six (same or different) states but not responsible for a particular issue area, and a third subset of the ten lobbyists is responsible for other states as well as a shared responsibility for the concept of sugar taxes. Hence, the organization might care about multiple aspects related to different types of soda taxes but allocate the reviewing responsibilities to different teams 510/520 in non-uniform ways.

When executing searches of the database, there are different types of user inputs 504 (e.g., search queries) and different ways that reviewers might be looking through pieces of legislation to find certain information. Even before formal legislation is proposed, public discussions may arise regarding soda taxes, which may be available through meeting agendas, hearing notes, press releases, social media posts, etc., that may enable the company to provide user input 504 via a search field to get a sense of legislative proposals that could be forthcoming. Thus, one or more teams 510/520 of reviewers might have to be able to receive/review hundreds of thousands of documents/information over a short period of time.

Accordingly, the updated functionalities associated with the tracking broad might include user interface(s) 502 where the one or more users can input 504, into a system, particular topics and/or search terms that the company/organization would be interested in. That is, the interface 502 may receive user input 504 that indicates how information should be selected and allocated to one or more different users or teams 510/520 performing the review for the company. The interface 502 may also be used to input search settings 506, such as user-specific settings 508*a* and/or organizational/team-wide settings 508*b* for a particular set of information being reviewed/tracked by the one or more different users or teams 510/520.

An individual user may then apply filter(s) 512 that indicate one or more additional layers of automated filtering, such as which U.S. states the individual user wants the output results to relate. The additional layers of automated filtering applied 512 to the search can be different for different users. For instance, if the individual user is one of two users responsible for sugar taxes, the individual user might not care about X, but may care about whether the second user (e.g., user X) has already reviewed a particular piece of legislation that was flagged as being potentially relevant to sugar taxes. Thus, the system may automatically remove search results from the output of the individual (first) user that the second user already reviewed. Applying the additional filtering functionality 512 on top of a search 504 performed by the individual user can allow the output search results 530 to be automatically filtered down in a more efficient manner for the individual user to review. Thus, a first list of search results 530 including item (1) through time Z may be specific to the first user. User X on the same team (e.g., Team 1 510) as the first user can similarly apply user X filter(s) 514 that are specific to user X to generate a second list of search results 532 including item (a) through item X that may be specific to user X. Likewise, a user Y on a different team (e.g., Team 2 520) than the first user can apply user Y filter(s) 516 that are specific to user Y to generate a third list of search results 534 including item (i) through item Y that may be specific to user Y.

A global filter based on the organizational/team settings 508b might only allow bills with certain characteristics (on top of the text of the bill) to be included in the output of a search. A first set of characteristics might be indicative of information that is no longer relevant to the user, and a second set of characteristics might be indicative of other information that is, or has become, relevant to the user. Thus, the settings 508a-508b for the global filters and specific filters 512-516 might have to be harmonized on both an individual level and an organizational level. The user interface 502 is implemented such that each user can input 504 information related to a same topic but receive search results 530-534 that are customized for the user in a specific way. For example, metadata added to individual information items, such as bills, pieces of regulation, documents, etc., allows the information items to be retrieved via an algorithm that outputs the results 530-534 based on a relevancy to a specific user and/or team 510/520.

The user interface 502 provides the functionality for the user to indicate a reason why certain information might be relevant or removed from consideration. Default options might correspond to whether the user has been added to a particular issue, whether the user marked something as higher or lower priority, etc. The interface 502 also executes in conjunction with a system where information can be marked as read or unread. For example, information might be automatically marked as read if another user on the same team 510 as the user has already reviewed the information. The user could also update the read status of the information manually (e.g., unmark the information as read) to provide user flexibility for a global tracking board (illustrated at 610 in FIG. 6). In some implementations, statuses may be updated in different ways, such as to provide information that the user has not already reviewed, to provide information that nobody else on the same team 510 has already reviewed, to provide information that only user X has reviewed, to provide information that a particular team (e.g., Team 2 520) has not already reviewed, etc.

Providing the interface 502 with functionality for the user to input 504 one or more reasons why certain information is relevant or not relevant enables the search engine to provide search results 530-534 that are more targeted in terms of a number of items that might be worth review/consideration. Prior models often output a large number of false negative fields. For example, out of two-hundred thousand bills, the user might only care about one-hundred of the bills, but far too many results may be output from the two-hundred thousand bills via prior models. Since many results are unimportant to the user's search, a system and interface 502 that allows the user to narrow the results based on one or more other users having already reviewed certain results may allow an efficiency of a user and/or team 510/520 to increase. That is, the user and/or the team 510/520 may be able to identify the one-hundred results of interest more quickly from the two-hundred thousand bills in the database.

Result reduction/elimination techniques might have been applicable to an entire organization via prior models. However, complexities associated with individual teams might render organization-wide reduction/elimination techniques impractical. For example, just because the sugar tax team might find a particular result irrelevant to the objectives of the sugar tax team, does not mean that the Alabama team or the regulatory team would necessarily find the same result irrelevant to their respective objectives. Thus, reducing/eliminating certain results at an organization level might not be consistent and/or effective across the organization as a whole. In an example, one organization might have twelve teams of people that are independent from each other, but might want to share search results 530-534 with each other. In another example, twelve different groups of people may be inputting 504 different search terms, but might want to share a same labeling structure with different users/groups while still remaining separate from the different users/groups. Functionalities of the interface 502 can provide users with the flexibility to eliminate items from the user's own search results 530, eliminate other items from the search results 530-534 of the team 510, eliminate items from the search results 534 at the organization level, etc. In some implementations, reduction/elimination techniques may be performed automatically based on various criteria. That is, reduction/elimination procedures may be performed based on more than simply marking or unmarking the search results 530-534 as relevant or not relevant to particular users or teams 510/520.

Algorithmically determining which items in the search results 530-534 certain users would be interested in reviewing can improve the efficiency of the users and/or teams 510/520 in cases where the documents within the database have little additional labeling. In an example, the algorithm may output results 530 that the user is predicted to care about, but also that have not already been reviewed by another user/team 520. In another example, the algorithm may output results 530 for bills that have certain characteristics, but not bills with those characteristics that other users on the same team 510 have already labeled in a certain way. For instance, if a bill was voted down with "no" votes, the bill may be eliminated from the output/results 530, as a bill that is no longer pending might not be important to the user anymore.

Flexibilities associated with the implemented searching techniques allow the user to receive a list of different result structures that are generated on an individualistic basis. Searches 504 may be based on certain topics, a number of results to be displayed, which filters each individual search has programmatically generated based on the legislation, data that is available to the system, etc. Other criteria might include settings 508b selected for the organization based on different organizational criteria. For example, the organization might only care about bills that include certain words, bills that have made it to a certain phase, etc. Metadata may be captured from user activity within the system and applied to the user-specific settings 508a. For example, the metadata may allow the algorithm to more accurately predict/output results 530-534 that specific users might want to review. The system can then compose respective sets of search results 530-534 that include certain criteria, but exclude particular items from the respective sets of search results 530-534 based on other criteria. The filtering 512-516 performed by the system can be based on boolean logic that outputs the different results 530-534 for the different users based on the different criteria. Different system settings 506 may be associated with different sets of filters 512-516. Using different filters 512-516 for different searches 504 can allow the system to generate lists of user-specific results 530-534.

Figure 6:
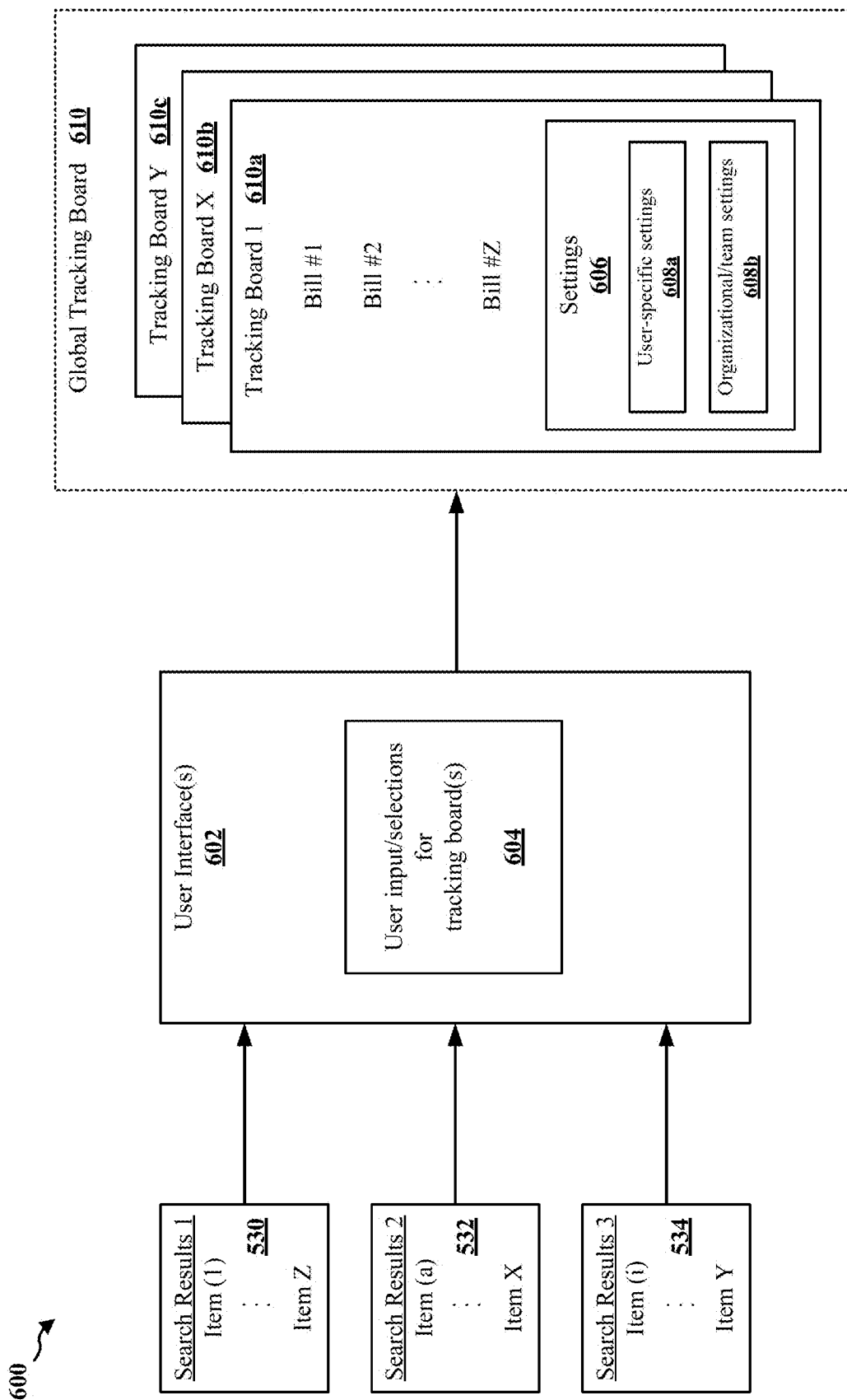
FIG. 6 is a diagram that illustrates tracking boards associated with a plurality of search results.

FIG. 6 is a diagram 600 that illustrates tracking boards associated with a plurality of search results 530-534. For the tracking boards 610, information can be stored in a dictionary-like format, where a mapping key can be used to map to values within the tracking boards 610. Each tracking board may be associated with one or more tracking boards. For example, user I may be associated with a first tracking board 610*a* that includes bills 1-Z, user X may be associated with a second tracking board 610*b* including another list of bills, and user Y may be associated with a third tracking board 610*c* including yet another list of bills. Each of the users may also have access to a global tracking board 610 associated with the user-specific tracking boards 610*a*-610*c*. For each of the one or more tracking boards 610, filtering for different groups/teams can be based on different values. For instance, a user that inputs the search term "soda tax" might be interested in bills that relate to both soft drinks and taxes. Thus, search terms such as soda, soft drinks, soft drink tax, etc., might also be relevant and may be associated with a search terms key. Filters can then be built on top of the search. For example, if the user is only interested in bills that are pending in the year 2022 that include the relevant search terms, a year filter with the number 2022 can be applied on top of the search.

Other filters may be applied to review criteria to filter results that have already been reviewed by other users of the team or organization. Further, results could be filtered based on whether they already include a stance, priority, issue, assignment, etc., where the filters can be combined/applied in any number of different ways (e.g., based on values). The tracking boards 610 can include tracking board settings 606, where the user can define user-specific settings 608*a* that may be stored on the tracking boards 610 so that, when a particular tracking board 610*a* is loaded, the user-specific settings 608*a* can indicate which user is to be presented certain results. The tracking boards settings 606 can also include organizational/team settings 608*b*. Different filter combinations might be based on metadata associated with the bills. For example, a bill might be filtered based on whether the bill fits certain criteria, whether the bill has already been reviewed by another user, etc. Based on the settings 606 of the tracking boards 610 and the metadata for the bills, the bills can be filtered to show the user a specific combination of information.

In an example where a team includes forty users, it may be inefficient to have each individual enter certain user-specific settings 608*a*. For instance, if the team is reviewing bills for soda tax, it may be inefficient to have all forty users on the team indicate that they care about bills related to soda tax. Thus, the organization level settings 608*b* may be used to indicate that bills related to soda tax are important. At the organization level, the bills could be further filtered so that the system only outputs results to users that have not already been reviewed by other users within the organization. If another user in the organization, or a subset of users within the organization, have already reviewed a bill, then that bill may be excluded from the output results.

User activity can be input 604 to the algorithm for user-level settings 608*a* to determine whether a particular result should be provided to the user. User interface(s) 602 may display the search results 530-534, so that the users can provide input/selections 604 for the tracking boards 610. That is, the users can indicate which bills should be added to their respective tracking boards 610*a*-610*c* or added to the global tracking board 610. If the user-level setting 608*a* is to only display sugar tax legislation if user X or user Y has not already reviewed it, then the activity of user X and user Y can influence the results 530 that are displayed to the user via the interface 602. Thus, a combination of the user settings 608*a* with the activity of the other users can provide the searching user with a higher probability of receiving/identifying the information that the searching user regards as relevant/important. Types of user activity that might impact the results 530 include an item being viewed, marking an item (e.g., supports or opposes), adding a particular stamp, indicating a certain priority, etc. Results can also be categorized based on an issue (e.g., tax bills). For instance, if a bill is a tax bill, then the bill might be removed from results generated for an agriculture team. Customized fields based on metadata, such as which users have already reviewed certain documents, can also be implemented for the system to adjust the tracking boards 610*a*-610*c* based on characteristics associated with the customized fields.

The tracking boards 610*a*-610*c* might be generated and indicated in an email based on the settings 606 for the tracking boards 610*a*-610*c*. For the user settings 608*a*, users set their own preferences and, if something changes, the user can adjust their own settings 608*a*. However, for organizational/team settings 608*b*, preferences are set at least on a team level, such that the settings 606 of the tracking board might be changed or updated in different ways that manipulate the search results (e.g., associated with a search term). The generated email may be automatically updated for users that rely on the associated tracking board. The email alert may be used for potentially relevant bills that could be important to the organization. The alerts are connected to the user's tracking board 610*a* so that if a new bill is introduced that matches the user settings 608*a* for the tracking board, an email alert may be generated for movements on the bills being tracked. Bills can be tracked based on priority, issues that the bills are associated with, etc. The email may be generated/sent to the user based on the user settings 608*a* (e.g., once per day in the morning). The user settings 608*a* may also allow the email to be generated/sent if a new bill is introduced that matches the settings.

If a user sets a stance on a bill as "supports" or "opposes", the user could be implicitly indicating that the bill is important to the organization. Thus, the bill may be pulled into the tracking system (e.g., based on a default setting). In contrast, if the user marks the bill as unimportant, the user is explicitly indicating that the bill is not important to the organization and that the bill can be cleared from the tracking board 610*a*, which may also occur based on a default setting. The default settings can be used to account for ways in which the activity of the user relates to the tracking board settings 606.

The tracking board 610*a* can be setup for bills to be cleared if a priority is added to the bill, if an issue is added to the bill, whether the bill has been reviewed/read by one or more other users, etc. Thus, bill tracking can be based on distinct fields. Some teams may setup a review process where a bill goes through multiple tiers of review. For example, a state legislative affairs team might perform a first round of review, a regional director might perform a second round of review, and a legal team might perform a third round of review: Custom fields associated with the tiers may allow users to add distinct data to the bills on their tracking boards 610*a*-610*c*, such that the users may follow the bill as they move through the review process based on their unique tracking data.

In another example, a two-tiered review system might include the trackers and the legal team. The trackers may only be permitted to mark the bills based on their own reviewing responsibilities. For instance, the trackers are not regarded as legal experts and, therefore, might not be able to flag a bill as important from a legal standpoint. However, if a particular tracker determines to watch/follow a bill through the legal review process by the legal team, the rest of the trackers on the tracking team may not have to continue following the bill. Thus, the bill may be removed from the tracking board 610*a* so that the activity is not duplicated by another tracker. The legal team may have a separate tracking board 610*c* for tracking their own activities. Accordingly, review procedures can be improved based on a system that includes different flexibilities for search results, settings, approvals, different levels and combinations of teams responsible for overlapping amounts of different information, and the like.

Figure 7:
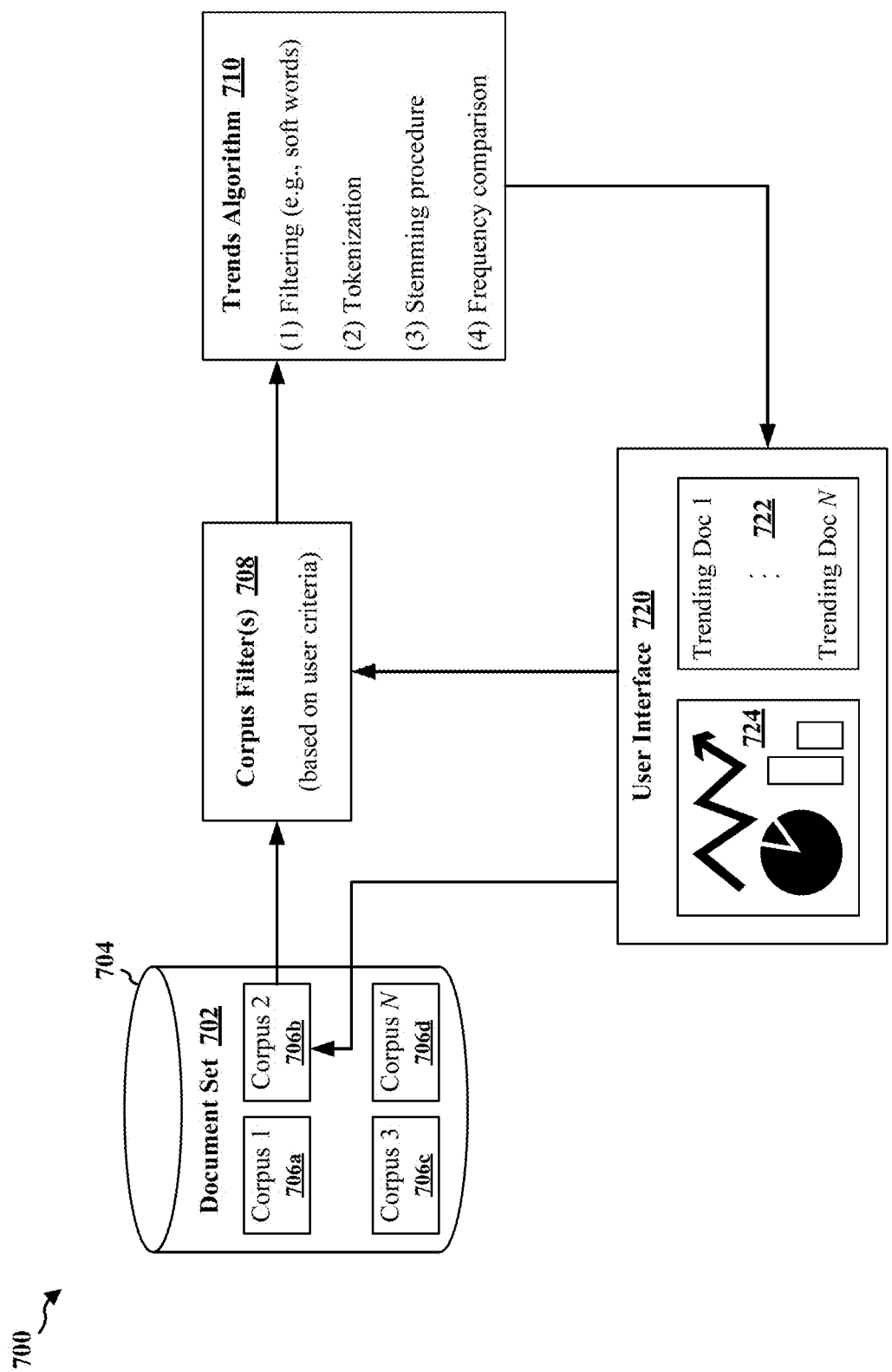
FIG. 7 illustrates a system for indicating trends in a document set.

FIG. 7 illustrates a system 700 for indicating trends in a document set 702. A "trends" feature may be implemented to analyze a set of documents stored on a system/database 704. The document set 702 can include one or more "corpuses" or "document corpuses", such as corpus 1 706*a*, corpus 2, 706*b*, corpus 3 706*c*, up through corpus N 706*d*. The trends feature (e.g., trends algorithm 710) can indicate, for example, news articles within a particular one of the corpuses 706*a*-706*d* that have been frequently accessed by one or more users over a certain period of time (e.g., news articles that are "trending" among other users). The trends algorithm 710 may cause a list of trending documents 722 to be displayed to the user at a user interface 720. For example, the trends algorithm 710 might cause a list of the top 6 trending news articles to be displayed to the user via the user interface 720. Other implementations of the trends algorithm 710 may include indicating a list of trending documents 722 for documents such as legislative bills, press releases, floor statements, social media posts, or other types of documents.

The system 700 is configured to receive, from the user interface 720, an indication of a particular document corpus (e.g., corpus 2 706*b*) from which the user is interested in viewing trends. For example, if the user practices patent law, the user may care about news articles that are trending in relation to patent law, and may not care about news articles that are trending in relation to Hollywood celebrities. Accordingly, the system 700 can receive an indication regarding an arbitrary corpus of documents (e.g., news articles) and output a set of results (e.g., trending documents) associated with the arbitrary corpus of documents. In the example above, the trending documents might be a list of articles that mention the phrase "patent law", a list of articles associated with a certain type of news organization, legislation from a particular geographic region, legislation that has been advanced to a particular stage, etc. In further examples, the indication received for outputting the list of trending documents 722 may be for legislative bills that were enacted in 2021, as opposed to 2022. Flexibilities associated with receiving an arbitrary indication of a document corpus (e.g., corpus 2 706*b* in the document set 702) can allow the trends algorithm 710 to output trends that are directed to the interests of the user.

One or more corpus filters 708 may be applied to the document corpus (e.g., corpus 2 706*b*) selected from the document set 702 based on user-specific criteria indicated by the user via the user interface 720. In other example, the user-specific criteria is not indicated by the user via the user interface 720, but determined based on other features, such as metadata. The corpus filter(s) 708 applied to the document corpus may correspond to same or similar filters as used to filter documents for other procedures, such as filters for keywords, matches to particular search phrases, and/or bills that have been indicated as being supported by the user. Accordingly, the list of trending documents 722 may correspond, for example, to just the bills that the user supports, and may exclude other bills, such as bills not tagged with an indication of support by the user. Trends may also be displayed for bills/documents that the user's team has flagged as being of interest.

All documents within the indicated corpus are identified prior to execution of the trends algorithm 710. A document in the corpus may refer to any text associated with metadata, where the metadata may be either global metadata or user-specific metadata. Global metadata may correspond to a certain structure, such as a document being of type x, from group y, with context z, whereas user-specific metadata may correspond to flags or customized indications created/generated by the user. After the documents in corpus 2 706*b* are identified and filtered with the corpus filter(s) 708 based on user-specific subsets/criteria, which may be arbitrary, the trends algorithm 710 is executed to determine trends associated with the remaining (e.g., filtered) documents of corpus 2 706*b*. Trending documents may change from time-to-time, such that the output list of trending documents 722 may be different at different times based on which documents are trending when the search/trends algorithm 710 is executed. The list of trending documents 722 are output from an (arbitrary) sub-corpus (e.g., corpus 2 706*b*) of the larger document set 702.

A primary data set, such as news data, may be sharded on a monthly basis for the trends functionality. That is, each month all indexes may be searched to update the index for the primary data set. As results are compared within an individual index, such updating techniques provide a parallel for cases where data might otherwise be updated/stored for two months, or for a different X duration of time, so that aggregations associated with the data may be performed similar to full cycle updates, but with a subset of the total data.

A query may be executed based on significant text aggregation, which compares one or more terms in a primary data set against one or more other terms in a background/baseline data set. For example, significant text aggregation may be performed to compare significant text (e.g., frequently found text within a given corpus over a last X time period) against the entire corpus without regard to information outside the corpus. That is, if a user is interested, for example, in trends associated with Idaho over the last day and the trends are compared against all documents in the data set, the output results might include a lot of information about potatoes, as potatoes may always be discussed in Idaho versus elsewhere. However, such results may be less relevant, given that the results only indicate trends that have occurred in Idaho versus elsewhere, as opposed to what the user is truly interested in, which is trends that have occurred in Idaho over the last few days versus the last month. Accordingly, significant text can be identified from corpus 2 706*b* and scored based on a comparison of differences in frequency, rareness, etc., among the entire data set to provide a more accurate output.

A subset of the corpus documents corresponding to the filtered corpus documents is associated with two temporal aspects, which include recent information and background/ non-recent information. Both of the two temporal aspects/ groups of data are associated with the filtered corpus of documents. Within each of the two temporal groups there may be N documents that each include a certain set of words. The set of words are convert into tokens. For example, if the set of words is "Mary had a little lamb", the trends algorithm 710 may determine whether each word is significant. If so, a token is generated for the word. A token may also be generated for the complete sentence. Alternatively, soft words like "a" in "Mary had a little lamb" might be less significant and may not merit a token. In other examples, "lamb" by itself without being preceded by "little" might be regarded as less significant. However, if "lamb" by itself is significant, in some examples a first token may be generated for "lamb" and a second token may be generated for the combination of "little lamb".

After the tokens are generated, a stemming procedure is performed to provide stability to the words. For example, in a data set is related to education, the terms "educator", "educate", "educational", etc., may be variants of the root word "education". The stemming procedure may associate the variants with the root word and remove extra features, such as numbers or special characters. Hence, filtering step(s) may be implemented to remove soft words and undesirable characters, a tokenization step may be implemented to split up the phrase, and then a stemming step may be implemented to combine tokens. If "Mary", "little", and "lamb" are determined to be the three words that are not soft words, and thus have tokens, n-grams may be generated for the tokens. The n-grams may correspond, for example, to unigrams that have one word per token, bigrams that have two words per token, etc., where "Mary" would correspond to a unigram (e.g., with 1 word per token) and "little lamb" would correspond to a bigram (e.g., with 2 words per token).

After performing tokenization, a frequency of each of the words in the two different corpuses may be calculated/ compared. In an example, if a temporal period of the last three days is compared with a temporal period of the last year, "Mary" may be identified on a 0.5% basis over the last year, but on a 6% basis over the last three days. Similarly, "lamb" may be identified on a 6% basis over the last year and on a 7% basis over the last three days. The frequencies at which the term are identified may be used to score the terms. An example technique that may be used to calculate the frequency of terms in the document corpus for a token may be term frequency-inverse document frequency (TF-IDF). A statistical procedure can be implemented to determine which tokens stand out the most. In the example, a different between 0.5% and 6% is probably more significant than the difference between 6% and 7%. Other approaches can include neural network and machine learning techniques.

After executing the trends algorithm 710, processing logic may be configured to adjust names of individuals that are predetermined to be associated with the data set. For example, "Gates" might be transformed into "Bill Gates", if "Bill Gates" appears frequently within the data set. Names of individuals that are mentioned in different documents may be stored in the database 704 for performing such functionality. Hence, in other examples, "Gates" might be transformed into "Melinda Gates", as opposed to "Bill Gates". Implementing post-processing techniques can provide increased relevancy to the output results. For example, if there is a term (e.g., Gates) that commonly has another word (e.g., Bill) associated with the term, and 90% of the time when "Gates" is identified within a certain field/ profession the word "Bill" precedes "Gates", the processing logic might display "Bill Gates" even if only the term "Gates" has been identified.

The processing logic can also filter adjacent terms that commonly appear together. For example, if "mass" and "shooting" commonly appear in the same text, the more frequent of those two terms might be used for filtering procedures. Thus, even if only "shooting" is identified in the text, the full term "mass shooting" can be displayed when the full term shows up in the text on an N percent basis. While one approach is to show words, such as "mass shooting" together, complexities may arise if "mass" and "shooting" are both independently determined to be common words within the document corpus (e.g., corpus 2 706b). If two terms frequently show up next to each other, a prefix/suffix implementation of the two terms is limited to one iteration of the two terms to prevent displaying duplicative results. For example, if "mass" has been upgraded to "mass shooting" and "shooting" has been upgraded to "mass shooting" and both terms appear next to each other in a portion of the text, the processing logic does not upgrade both terms. Instead, the processing logic upgrades one of the terms and eliminates the other to prevent duplication of the combined phrase. In examples, whichever term is determined to be more-rare might the term that is upgraded for the output results.

One or more visualizations 724 (e.g., graphs, charts, etc.) may also be generated to show how different terms have trended over time. For example, a frequency of a term may be determined on a per time interval basis (e.g., per day, per month, per year, etc.) to show how the term was trending over the corresponding time interval. Hence, the visualization 724 might show when/where usage of the term spiked within the data set and when/where the term was not used as frequently. The visualization 724 might also indicate a frequency calculation technique (e.g., TF-IDF) that was used to determine the frequency of the term over the time interval.

Figure 8:
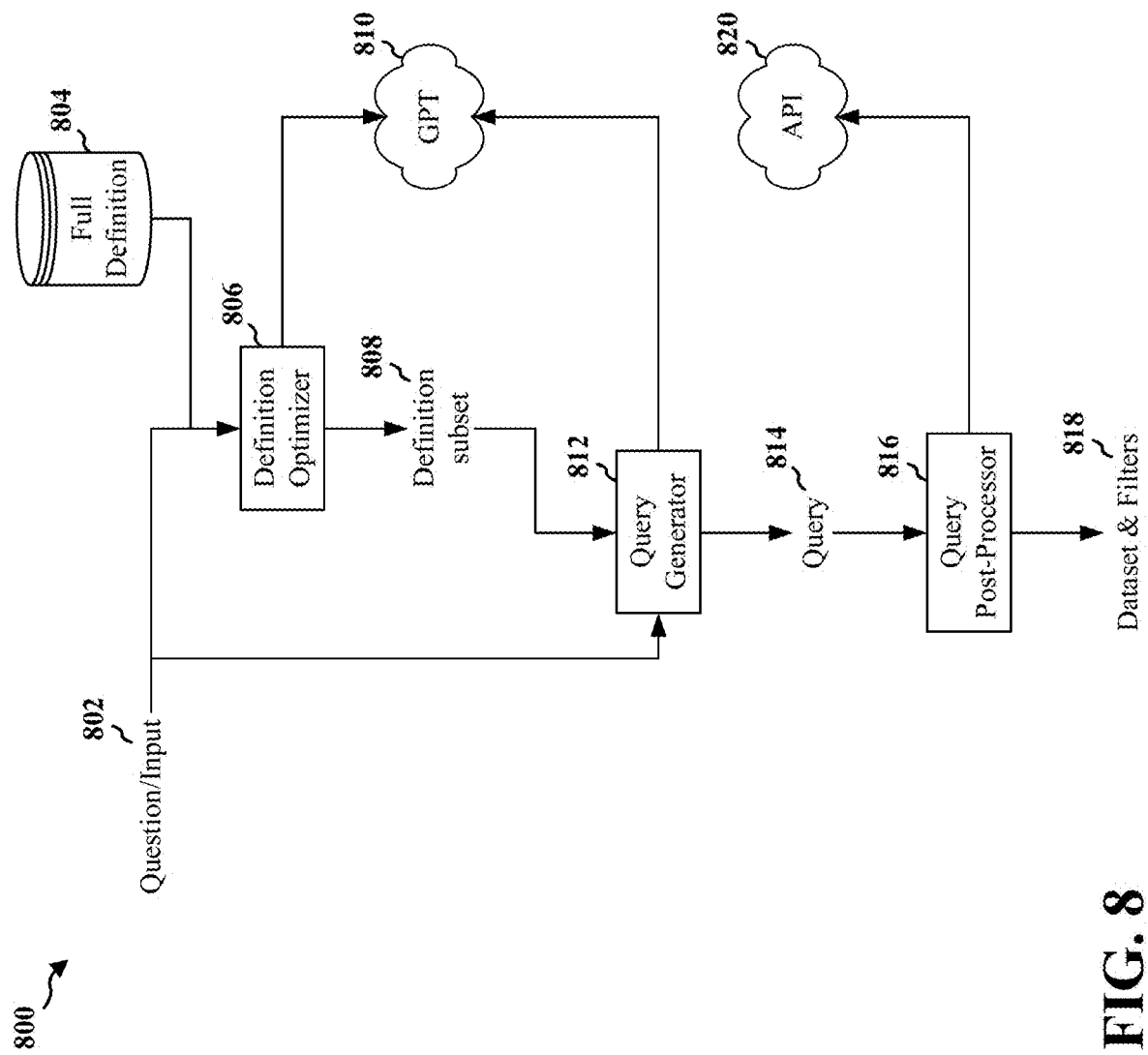
FIG. 8 illustrates a diagram for applying structured filtering to a natural language input.

FIG. 8 illustrates a diagram 800 for applying structured filtering to a natural language input. Many search interfaces, such as online search interfaces, apply a combination of filters and natural language query operators to return a search result for a search query. For example, a user may indicate via the search interface to return one or more search results that include word A and word B, but not word C. The software application associated with the search interface will perform a search across a data set and apply various filtering to the data set/search results based on the search query.

Some search interfaces may not be user-friendly in terms of their searching and filtering operations. For example, in a legal research context, if a patent practitioner wants to perform a search of database that differentiates between patent applications that have been filed, published, allowed, issued, etc., the patent practitioner would have to know that such filters exist with respect to the search interface in order to apply the appropriate filters for the search. That is, the patent practitioner may have to know that a "patent status" filter is located under a certain filter sub menu to instruct the search interface to output the desired results. If the patent practitioner simply performed a word search, such as for the word "pending", without applying the appropriate filtering, the search interface may output one or more search results that include the word "pending" in the text, rather patent applications that have a pending status.

Providing a search interface that utilizes user input to interact with structured metadata from a data/document set can allow the user to obtain more desirable search results, particularly when the user lacks knowledge of searching and filtering operations commonly applied by legacy search interfaces. A search interface that can receive a natural language question/input 802 and utilize generative artificial intelligence (AI) to select the appropriate filters for the search based on the natural language question/input 802 may provide a more user-friendly search interface.

While some leading search engines may appear to have a more sophisticated ability to generate outputs based on natural language inputs, such as a natural language input that provides a request for the search engine to return a search result that includes X, but not Y, the natural language input is not actually used in association with structured filtering. For example, the user cannot provide a natural language input into an existing search engine indicating that the search engine is to only return results of "legislative bills that have been passed by one chamber and not the other" and expect that the output of the search engine will include only the desired results (e.g., in their entirety) and no other results or missing results. Instead, it is likely that one or more of the returned results will not meet the exact criteria input by the user and/or that one or more of the desired results will be missing from the returned results. Even if a sophisticated search engine implements machine learning (ML), for example, to leverage information from other users and indicate that "the returned query result is from clicking a particular page", the user cannot actually input "show only results that contain X" or "show only news sites" and receive a complete and accurate query result, as generating such results would require categorical filtering.

Generative AI techniques may be used to apply filtering to a data set based on the natural language question/input 802. The user may input a natural language string of text via the search interface, which may then apply the appropriate filters and outputs more accurate/desirable search results. For example, if the natural language input is: "show me patent applications that have been filed, but not yet allowed, and that also mention the term AI", an AI/ML model can be used to determine the applicable filters and narrow down the output results, which may improve the accuracy of the output. In a government affairs context, the natural language input could be: "show me bills that have passed one chamber, but not the other, sponsored by a Republican, that mentioned clean energy, and that someone on my team has previously said they think is important." The AI/ML model can similarly determine the applicable filtering to narrow down the output results and provide improved accuracy. Accordingly, the techniques described herein are not limited to any particular context and may be broadly implemented as needed by the user.

Using the techniques described herein, the user does not have to manually select all the filters for the dataset and/or know that the filters exist and how to implement them. The process is streamlined (and made simpler) by inputting a natural language string of text, which is then used as the basis for the AI/ML model to select the filtering operations for the search. The AI/ML model can also determine based on the natural language input which dataset to search, even in cases where the user himself may not know where to search. The current techniques reduce the taxonomic sophistication required of user. For example, the user does not need to know specific search structures, such as "author: X, subject: Y", when providing an input to a search bar/search interface Instead, the user may provide the natural language input of "show me emails from author X where the emails mention Y" to receive a same or similar output without knowledge of any specific taxonomy.

The benefit of a system that utilizes AI-selected filtering operations is that if the user input is "show me legislative bills that have passed one chamber but not the other" or "show me patents that have been filed but not allowed", the results will be more accurate because the filtering operations are based on structured metadata within the data set. The output corresponds to an index within the database that applies the same filtering criteria the user would otherwise have to manually determine/select using prior searching techniques. Even generative pretraining transformer (GPT) chat applications do not provide the same level of control that the current techniques provide over the output results, as the output of such GPT chat applications is unstructured. That is, a user may be able to input a query into the chat application but cannot use the input for objective/structured filtering of the output results.

Structured filtering for natural language inputs based on generative AI can provide a solution on the spectrum between manual filtering (e.g., a user physically selecting the filters) and unstructured filtering (e.g., performed by GPT chat applications). The techniques described herein support a wide variety of different types of inputs. For example, the input may be "find bills that are sponsored by Democrats" or "find legislation where the primary author is in the party associated with the color blue", but is then converted using an AI/ML model into a structured query 814, such as "sponsor_party: democrat", that the system can understand and apply to output the relevant search results. Hence, natural language user text/input is transformed into structured filters to increase the accuracy of the output results while decreasing the complexity to the user. That is, the user can have the exact filters applied to the search that they would otherwise want to manually select, but in a colloquial natural language manner.

The generative AI system is trained on the query language, so that when the user provides a natural language expression, the system can transform the natural language expression into structured query language recognizable by the system (e.g., as an intermediate step of the search). For example, a large language model (LLM) may be trained to understand the specific query language used by the system, so that when the user inputs unstructured questions into a search interface, the system can apply the structured query language specifically used by the system. The structured query language is run through the system to output the results. The model may be trained on any structured query language and implemented for any application that utilizes filtering. The system can store the structured query language in a small enough byte of information for the LLM to effectively process it, as some LLMs may be limited in terms of a maximum amount of information that can be processed at once. Thus, a scale of the query is reduced to provide for encapsulation of the information.

A user interface (UI) may be implemented for the user to input a question 802 into the system. For example, the user may provide through the UI a question or input 802, such as "display all republicans from California" and the expectation from the user is that the system will return/output the complete and correct results. The system converts the natural language question/input 802 into a structured form to filter a dataset for the search results. For example, the system may convert the natural language question/input 802 into JavaScript Object Notation (JSON) or any other type of language. Even if the question/input 802 does not unambiguously use the term "elected officials", the system may determine that independently. For example, since the example question/input 802 recites the word "Republicans", the system may determine to apply an "elected officials" filter to the dataset for the Republican party and a "states" filter for California, even without the word "states" being recited in the question/input 802.

The user may provide the question/input 802 to the system through the UI, where the question/input 802 can be a natural language question/input 802. The definition optimizer 806 receives both the question/input 802 via the UI as well as an indication of one or more full definitions from a database 804. For any given dataset, the system stores one or more filters in a structured format, which can be applied to the dataset associated with question/input 802. In an example, the definition for the term "officials" corresponds to the code associated with the filter.

The definition optimizer 806 indicates to the GPT 810, which filters are available as well as the question/input 802 and associated context. The AI/ML model may be trained using one shot learning based on the context, as opposed to pre-training the model. Accordingly, if the model receives the input of "introduced bills", the model may output bills, a status, etc., based on the data set. Providing the model with increased context can improve the accuracy of the output results.

The inputs into the system are associated with the full possible set of filters that the system could apply, which may be in contrast to other systems where the schema for a database is executed one at a time. For example, using the current techniques in the context of patent searching, the system is structured to understand that all patents have an inventor name, an applicant, a status, a description, etc., and that these different types of data can be used for identifying different filters that exist for the data. Such techniques can simplify the scale of searching large datasets, which may include dozens of different types of data, where each different type of data may have dozens of different filters that could be applied to the data.

The database 804 including the full definition may be large in terms of scale (e.g., a lot of text may be stored in the database 804). Further, generative AI systems can be limited in terms of the amount of text they can process at once. The more text that is provided to a generative AI system, the more likely the generative AI system is to get confused (e.g., the more likely the generative AI system is to provide an output of decreased accuracy). However, the accuracy of the output may be increased by narrowing down the dataset based on the context. The definition optimizer 806 processes the question/input 802 and the full definition from the database 804 to determine a subset of information (e.g., definition subset 808) which is provided to the model via the query generator 812. Based on the question/input 802 and the definition subset 808 of the full definition 804, the query generator 812 outputs a structured query 814. An LLM is trained on how to transform the unstructured question/input 802 into a structured query 814. In addition, by reducing the full definition 804 to a definition subset 808, which may also be based on implementation of an LLM, the system is able to support a larger scale of querying and improve the accuracy of the output.

The definition optimizer 806 receives the full definition from the database 804 and reduces the size of the full definition into a smaller amount of information. The information is provided to the GPT 810, which may return a dataset related to the question/input 802 and indicate the filters associated with the question/input 802. The system may apply the determined/selected filters to resolve the question/input 802 received from the user. In examples, the definition subset 808 is converted into a JSON schema, which may strictly define properties, types, inputs, etc. The shortened definition 808 is converted to the JSON schema together with the question/input 802 and provided to the query generator 812. The query generator 812 may provide an output to the GPT 810 in addition to generating the query 814.

The query generator 812 is the mechanism that transforms the natural language question/input 802 into the structured query 814 used by the system. For example, if the question/input 802 is "display patents that mentioned X that have been filed but not yet allowed", the definition optimizer 806 first determines that the search is related to patents, as opposed to laws or other legal constructs. That is, the definition optimizer 806 determines a domain of the search. The definition optimizer 806 may subsequently determine that the search is related to "patent status" and "patent content". Thus, the techniques described herein use a two-step process, where a first step is to determine the domain of the search (e.g., the kinds of things the user is asking for) and a second step is to narrow down the information to the definition subset 808. The query generator 812 transforms the question/input 802 of the user into indications of both filters and the values for application of the filters, whereas the definition optimizer 806 implements a pre-processing step to increase the accuracy of the query generator 812.

The structured query 814 is used for generating data requests and applying the filters on the data set. That is, the filters are applied to the data values to output a result of the dataset and filters 818. A query post-processor 816 (e.g., a Sherlock) receives the query 814 and performs the validation based on the definition subset 808 to ensure that the GPT 810 has not generated an untrustworthy output. For example, the query post-processor 816, which may also be referred to as a query rationalizer, may verify that the GPT 810 has not indicated to apply/use filters that do not exist or apply/use a filter in an incorrect manner. In an example where the question/input 802 is "show bills sponsored by Senator Z", the query generator 812 may determine that there exists a filter "sponsored_by_or" and that the value being searched is "Senator Z". However, "Senator Z" is a string and not an identifier (ID) that exactly maps to a single person. Thus, the query post-processor layer may determine the associated person record that can be passed into the final filter based on the string "Senator Z".

The query generator 812 calls the LLM, such that the associated layer can perform, based on the output of the LLM, the final transformation and checks to ensure that the output is compatible with the system. The output from the query post-processor 816 is indicated to an API 820 and the results of the query 814 are provided to the user based on the dataset and filters 818. Such procedures associated with the generated query 814 may be regarded as a post-processing step that transforms an initial filter structure generated by the GPT 810 from a natural language string to a format that an application executing on the system will understand.

Accordingly, the system receives unstructured user input 802 from a user and converts the unstructured input 802 into a structured query language 814, such that the user can search a structured database 804 of information with an unstructured input 802 but retain an ability to filter the dataset with precision. Through a multi-step process that leverages an LLM trained on the structure, the system can receive the question/input 802 and model the structure of a query 814 based on the schema associated with the database 804. The LLM is able to determine the domain of the search and the information to be filtered, which filters are to be applied, and the values of the filters. The filtering may occur for system provided information and/or user provided information (e.g., both at the same time). In some instances, the LLM is not trained prior to implementing the techniques described herein. In other instances, the LLM is improved through training procedures, even though training may not be necessary. Instead of training the model on the dataset, which can be associated with high overhead/expensive and not actually provide the filtering benefits described herein, the model is trained on definitions and/or example queries of the schema for the dataset. When model training is performed, each question/input 802 and generated query 814 can be stored to receive feedback from the user indicating whether the generated query 814 is accurate. Then, based on the feedback, the model can be further trained to provide outputs with improved accuracy.

Figure 9:
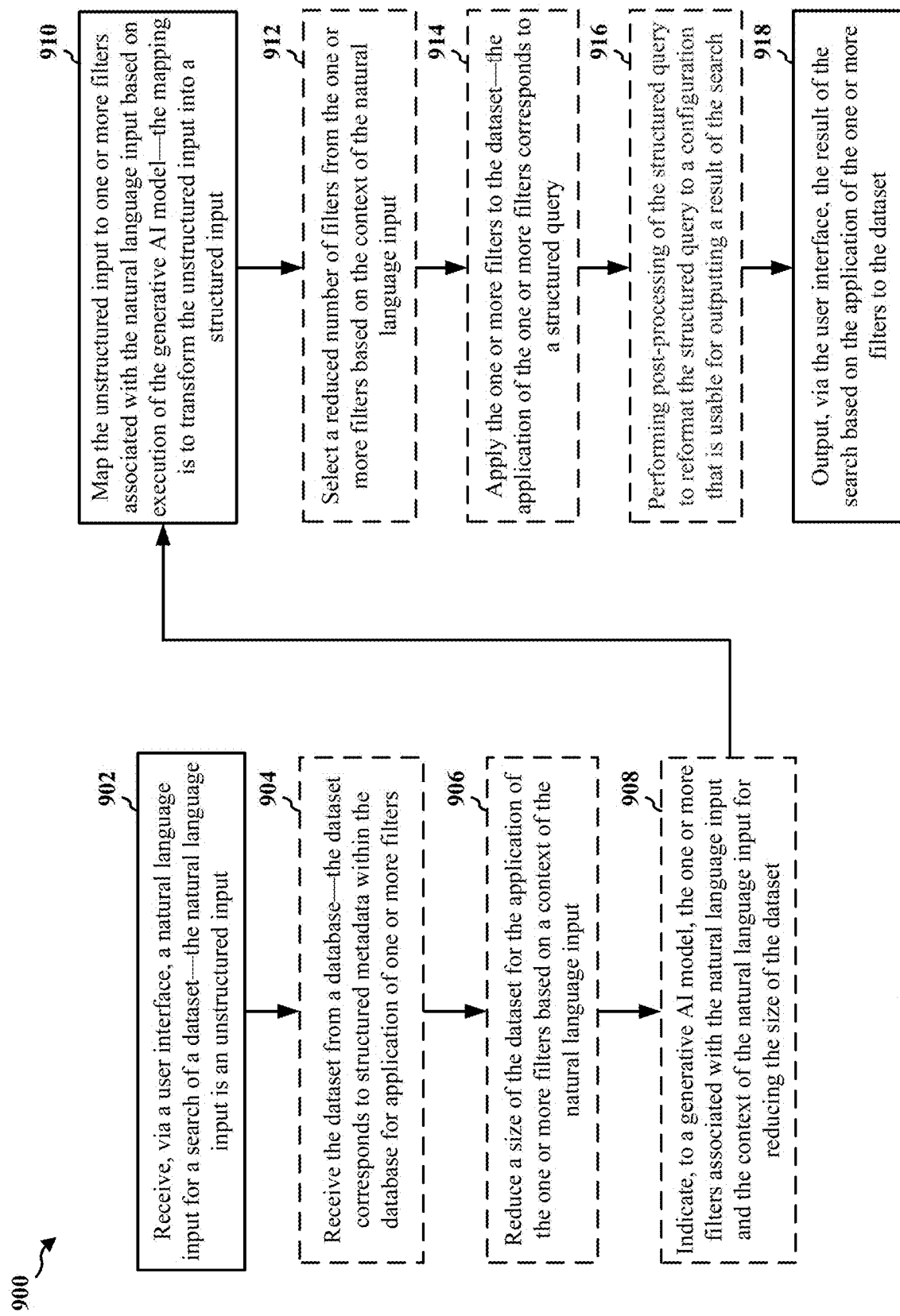
FIG. 9 is a flowchart of a method of filtering a dataset.

FIG. 9 is a flowchart 900 of a method of filtering a dataset. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-8.

With reference to FIG. 9, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed. Dashed lines can indicate optional steps, such as dependent features.

The method begins at block 902, where processing logic receives, via a user interface, a natural language input for a search of a dataset—the natural language input is an unstructured input. For example, the system of the diagram 800 receives an unstructured natural language question/input 802 for a search of the database 804.

At block 904, the processing logic receives the dataset from a database—the dataset corresponds to structured metadata within the database for application of one or more filters. For example, in the diagram 800, the definition optimizer 806 receives, based on structured metadata within the database 804, the full definitions from the database 804.

At block 906, the processing logic reduces a size of the dataset for the application of the one or more filters based on a context of the natural language input. For example, in the diagram 800, the definition optimizer 806 reduces the full definitions received from the database 804 to a definition subset 808 (e.g., based on a context of the natural language input/question 802)

At block 908, the processing logic indicates, to a generative AI model, the one or more filters associated with the natural language input and the context of the natural language input for reducing the size of the dataset. For example, in the diagram 800, the definition optimizer 806 indicates, to the GPT 810, available filters for filtering the dataset based on the context of the natural language question/input 802.

At block 910, the processing logic maps the unstructured input to one or more filters associated with the natural language input based on execution of the generative AI model—the mapping is to transform the unstructured input into a structured input. For example, in the diagram 800, the query generator 812 maps the unstructured natural language question/input 802 to the definition subset 808 based on the structured metadata.

At block 912, the processing logic selects a reduced number of filters from the one or more filters based on the context of the natural language input. For example, the system of the diagram 800, selects filters for the dataset based on the definition subset 808.

At block 914, the processing logic applies the one or more filters to the dataset—the application of the one or more filters corresponds to a structured query. For example, in the diagram 800, the query generator 812 applies the selected filters to the dataset to generate a structured query 814.

At block 916, the processing logic performs post-processing of the structured query to reformat the structured query to a configuration that is usable for outputting a result of the search. For example, the system of the diagram 800 transforms an initial filter structure generated by the GPT 810 from a natural language string to a format that an application executing on the system is configured to read.

At block 918, the processing logic outputs, via the user interface, the result of the search based on the application of the one or more filters to the dataset. For example, the system of the diagram 800 applies the dataset and filters 818 based on the structured query 814 to output the search results of the unstructured natural language question/input 802.

Figure 10:
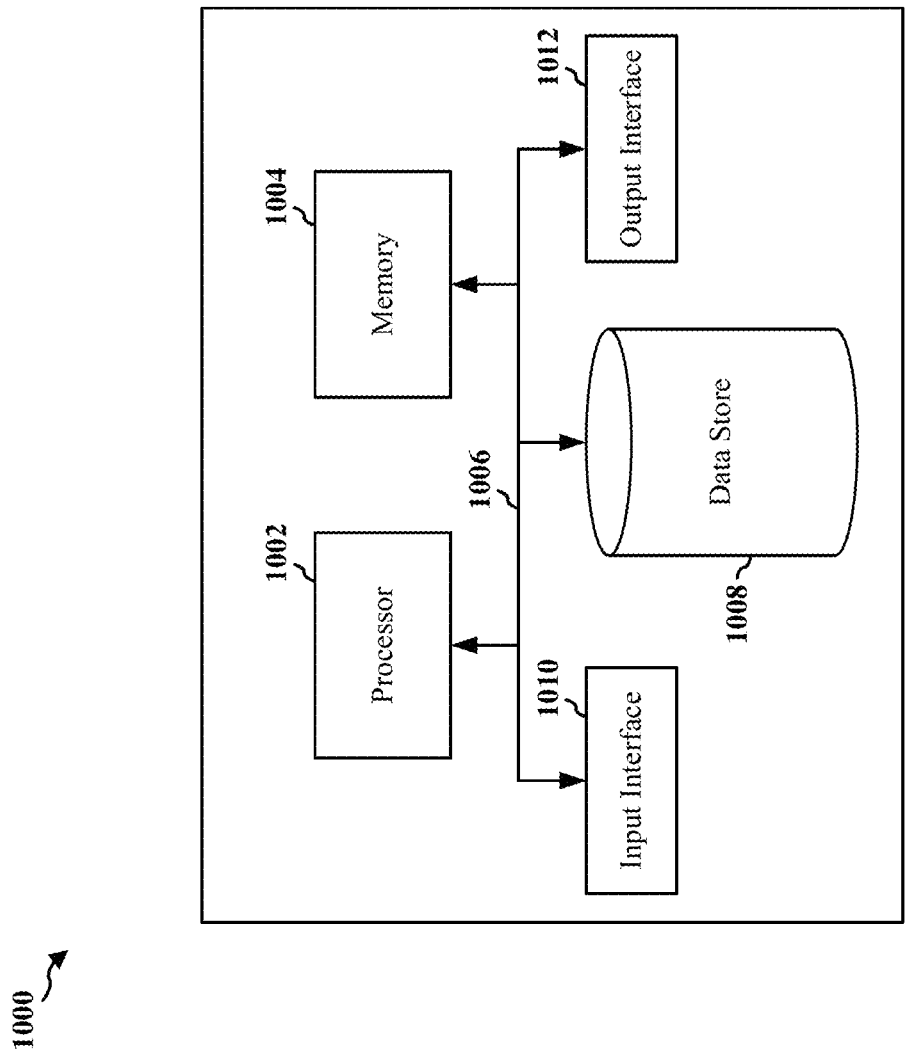
FIG. 10 is a high-level illustration of an exemplary computing device that can be used in accordance with the systems and methodologies disclosed herein.

FIG. 10 is a high-level illustration of an exemplary computing device 1000 that can be used in accordance with the systems and methodologies disclosed herein. For instance, the computing device 1000 may be or include the device 104. The computing device 1000 includes at least one processor 1002 that executes instructions that are stored in a memory 1004. The instructions may be, for instance, instructions for implementing functionality described as being carried out by one or more modules or instructions for implementing one or more of the methods described above. The processor 1002 may access the memory 1004 by way of a system bus 1006.

The computing device 1000 additionally includes a data store 1008 that is accessible by the processor 1002 by way of the system bus 1006. The data store 1008 may include executable instructions and the like. The computing device 1000 also includes an input interface 1010 that allows external devices to communicate with the computing device 1000. For instance, the input interface 1010 may be used to receive instructions from an external computing device, from a user, etc. The computing device 1000 also includes an output interface 1012 that interfaces the computing device 1000 with one or more external devices.

Additionally, while illustrated as a single system, it is to be understood that the computing device 1000 may be a distributed system. Thus, for instance, several devices may be in communication by way of a network connection and may collectively perform tasks described as being performed by the computing device 1000.

The description herein is provided to enable a person skilled in the art to practice the various aspects described herein. Various modifications to these aspects will be readily apparent to those skilled in the art, and the generic principles defined herein may be applied to other aspects. Thus, the claims are not limited to the aspects described herein, but are to be interpreted in view of the full scope of the present disclosure consistent with the language of the claims.

Reference to an element in the singular does not mean "one and only one" unless specifically stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Unless specifically stated otherwise, the term "some" refers to one or more. Combinations such as "at least one of A, B, or C" or "one or more of A, B, or C" include any combination of A, B, and/or C, such as A and B, A and C, B and C, or A and B and C, and may include multiples of A, multiples of B, and/or multiples of C, or may include A only, B only, or C only. Sets should be interpreted as a set of elements where the elements number one or more.

Unless otherwise specifically indicated, ordinal terms such as "first" and "second" do not necessarily imply an order in time, sequence, numerical value, etc., but are used to distinguish between different instances of a term or phrase that follows each ordinal term.

Structural and functional equivalents to elements of the various aspects described throughout this disclosure that are known or later come to be known to those of ordinary skill in the art are expressly incorporated herein by reference and are encompassed by the claims. The words "module," "mechanism," "element," "device," and the like may not be a substitute for the word "means." As such, no claim element is to be construed as a means plus function unless the element is expressly recited using the phrase "means for." As used herein, the phrase "based on" shall not be construed as a reference to a closed set of information, one or more conditions, one or more factors, or the like. In other words, the phrase "based on A", where "A" may be information, a condition, a factor, or the like, shall be construed as "based at least on A" unless specifically recited differently.

The following aspects are illustrative only and may be combined with other aspects or teachings described herein, without limitation.

Example 1 is a method of filtering a dataset, including: receiving, via a user interface, a natural language input for a search of the dataset, the natural language input being an unstructured input: mapping the unstructured input to one or more filters associated with the natural language input based on execution of a generative AI model, the mapping being to transform the unstructured input into a structured input; and outputting, via the user interface, a result of the search based on an application of the one or more filters to the dataset.

Example 2 may be combined with Example 1 and further includes receiving the dataset from a database, the dataset corresponding to structured metadata within the database for the application of the one or more filters; and reducing a size of the dataset for the application of the one or more filters based on a context of the natural language input.

Example 3 may be combined with any of Examples 1-2 and further includes indicating, to the generative AI model, the one or more filters associated with the natural language input and the context of the natural language input for the reducing the size of the dataset.

Example 4 may be combined with any of Examples 1-3 and includes that transformation of the unstructured input into the structured input is based on mapping the unstructured input to a reduced number of filters associated with the reducing the size of the dataset.

Example 5 may be combined with any of Examples 1-4 and further includes selecting the reduced number of filters from the one or more filters based on the context of the natural language input.

Example 6 may be combined with any of Examples 1-5 and further includes applying the one or more filters to the dataset, wherein the application of the one or more filters corresponds to a structured query.

Example 7 may be combined with any of Examples 1-6 and includes that the generative AI model is trained on a language associated with the structured query.

Example 8 may be combined with any of Examples 1-7 and includes that the language associated with the structured query is reduced to a threshold byte size for encapsulation, the threshold byte size being processable by the generative AI model.

Example 9 may be combined with any of Examples 1-8 and further includes performing post-processing of the structured query to reformat the structured query to a configuration that is usable for the outputting the result of the search.

Example 10 may be combined with any of Examples 1-9 and includes that a name of the one or more filters is not an exact match to a term in the natural language input.

Example 11 is an apparatus for wireless communication for implementing a method as in any of examples 1-10.

Example 12 is an apparatus for wireless communication including means for implementing a method as in any of examples 1-10.

Example 13 is a non-transitory computer-readable medium storing computer executable code, the code when executed by at least one processor causes the at least one processor to implement a method as in any of examples 1-10.

What is claimed is:

1. A method of filtering a dataset, comprising:
receiving, via a user interface, a natural language input for a search of the dataset, the natural language input being an unstructured input;
mapping the unstructured input to one or more filters associated with the natural language input based on execution of a generative artificial intelligence (AI) model, the mapping being to transform the unstructured input into a structured input structured input, wherein to transform the unstructured input into the structured input, the mapping of the unstructured input is made to a reduced number of filters associated with reducing a sizer of the dataset; and
outputting, via the user interface, a result of the search based on an application of the reduced number of filters to the dataset.

2. The method of claim 1, further comprising:
receiving the dataset from a database, the dataset corresponding to structured metadata within the database for the application of the reduced number of filters; and
reducing a size of the dataset for the application of the reduced number of filters based on a context of the natural language input.

3. The method of claim 2, further comprising:
indicating, to the generative AI model, the one or more filters associated with the natural language input and the context of the natural language input for the reducing the size of the dataset.

4. The method of claim 2, further comprising:
selecting the reduced number of filters from the one or more filters based on the context of the natural language input.

5. The method of claim 1, further comprising:
applying the reduced number of filters to the dataset, wherein the application of the reduced number of filters corresponds to a structured query.

6. The method of claim 5, wherein the generative AI model is trained on a language associated with the structured query.

7. The method of claim 6, wherein the language associated with the structured query is reduced to a threshold byte size for encapsulation, the threshold byte size being processable by the generative AI model.

8. The method of claim 5, further comprising:
performing post-processing of the structured query to reformat the structured query to a configuration that is usable for the outputting the result of the search.

9. The method of claim 1, wherein a name of the one or more filters is not an exact match to a term in the natural language input.

10. An apparatus for filtering a dataset, comprising:
a memory; and
at least one processor coupled to the memory and configured to:
receive, via a user interface, a natural language input for a search of the dataset, the natural language input being an unstructured input;
map the unstructured input to one or more filters associated with the natural language input based on execution of a generative artificial intelligence (AI) model, the mapping being to transform the unstructured input into a structured input, wherein to transform the unstructured input into the structured input, the mapping of the unstructured input is made to a reduced number of filters associated with reducing a size of the dataset; and
output, via the user interface, a result of the search based on an application of the reduced number of filters to the dataset.

11. The apparatus of claim 10, wherein the at least one processor is further configured to:
receive the dataset from a database, the dataset corresponding to structured metadata within the database for the application of the reduced number of filters; and
reduce a size of the dataset for the application of the reduce number of filters based on a context of the natural language input.

12. The apparatus of claim 11, wherein the at least one processor is further configured to:
indicate, to the generative AI model, the one or more filters associated with the natural language input and the context of the natural language input to reduce the size of the dataset.

13. The apparatus of claim 11, wherein the at least one processor is further configured to:
select the reduced number of filters from the one or more filters based on the context of the natural language input.

14. The apparatus of claim 10, wherein the at least one processor is further configured to:
apply the reduced number of filters to the dataset, wherein the application of the reduced number of filters corresponds to a structured query.

15. The apparatus of claim 14, wherein the generative AI model is trained on a language associated with the structured query.

16. The apparatus of claim 15, wherein the language associated with the structured query is reduced to a threshold byte size for encapsulation, the threshold byte size being processable by the generative AI model.

17. The apparatus of claim 14, wherein the at least one processor is further configured to:
perform post-processing of the structured query to reformat the structured query to a configuration that is usable for the outputting the result of the search.

18. The apparatus of claim 17, wherein a name of the one or more filters is not an exact match to a term in the natural language input.

19. A non-transitory computer-readable medium storing computer executable code, the code when executed by at least one processor causes the at least one processor to:
receive, via a user interface, a natural language input for a search of a dataset, the natural language input being an unstructured input;
map the unstructured input to one or more filters associated with the natural language input based on execution of a generative artificial intelligence (AI) model, the mapping being to transform the unstructured input into a structured input, wherein to transform the unstructured input into the structured input, the mapping of the unstructured input is made to a reduced number of filters associated with reducing a size of the dataset; and
output, via the user interface, a result of the search based on an application of the reduced number of filters to the dataset.

20. The non-transitory computer-readable medium of claim 19, wherein the at least one processor is further configured to:
receive the dataset from a database, the dataset corresponding to structured metadata within the database for the application of the reduced number of filters; and
reduce a size of the dataset for the application of the reduce number of filters based on a context of the natural language input.

* * * * *